United States Patent
Sahlin

(10) Patent No.: US 8,594,582 B2
(45) Date of Patent: Nov. 26, 2013

(54) RECEIVER FOR A RADIO NETWORK AND AN METHOD FOR DETERMINING A CHANNEL ESTIMATE FOR A RADIO CHANNEL

(75) Inventor: Henrik Sahlin, Mölnlycke (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 800 days.

(21) Appl. No.: 12/599,426

(22) PCT Filed: May 9, 2007

(86) PCT No.: PCT/SE2007/050320
§ 371 (c)(1),
(2), (4) Date: Nov. 9, 2009

(87) PCT Pub. No.: WO2008/140368
PCT Pub. Date: Nov. 20, 2008

(65) Prior Publication Data
US 2010/0317305 A1    Dec. 16, 2010

(51) Int. Cl.
*H04B 17/00*    (2006.01)
(52) U.S. Cl.
USPC .................................. 455/67.11; 375/260
(58) Field of Classification Search
None
See application file for complete search history.

(56) References Cited

U.S. PATENT DOCUMENTS

| | | | |
|---|---|---|---|
| 2004/0146117 A1* | 7/2004 | Subramaniam et al. | 375/260 |
| 2004/0203442 A1* | 10/2004 | Krishnan et al. | 455/67.11 |
| 2007/0110201 A1* | 5/2007 | Mergen et al. | 375/350 |
| 2009/0268787 A1* | 10/2009 | Cairns et al. | 375/148 |

FOREIGN PATENT DOCUMENTS

| | | |
|---|---|---|
| JP | 2007-096468 A | 4/2007 |
| WO | WO2006/096784 | 9/2006 |

* cited by examiner

*Primary Examiner* — Zhiyu Lu

(57) ABSTRACT

The present invention relates to a receiver for a radio network. The receiver comprises a receiving unit and a channel estimation unit (18). The receiving unit is arranged to receive a number of time domain signals forming a plurality of symbols, each symbol having a cyclic prefix. The channel estimation unit is (18) arranged to determine a channel estimate ($h_{os}$) in the time domain for a user (u) based on known pilots in the signals received by the receiving unit, and to determine the channel estimate ($h_{os}$) estimate ($h_{os}$) for a user (u) using a DFT matrix (V) with a fundamental period related to a number ($N_c$) of sub-carriers associated to said user (u), wherein the channel estimate ($h_{os}$) has a length of L taps, L being less that the number ($N_c$) of sub-carriers associated to said user. The present invention also relates to a method for determining a channel estimate ($h_{os}$) for a radio channel.

23 Claims, 5 Drawing Sheets

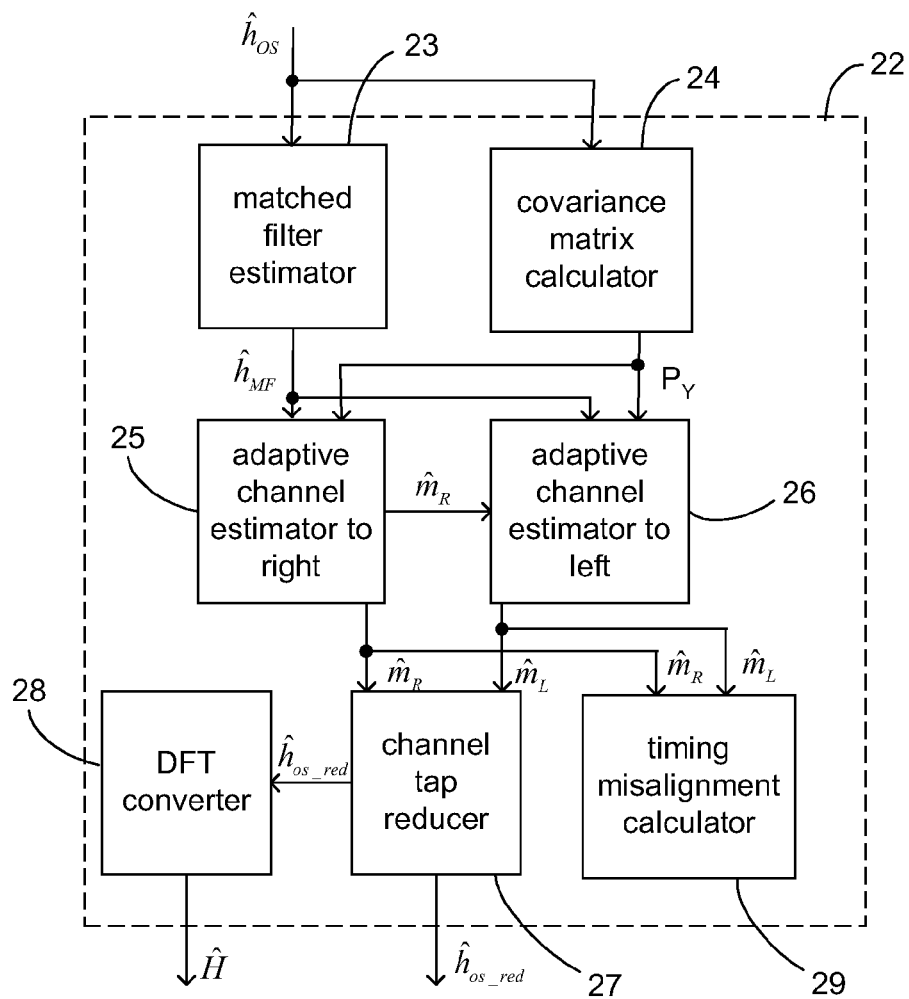

RECEIVER FOR A RADIO NETWORK AND AN METHOD FOR DETERMINING A CHANNEL ESTIMATE FOR A RADIO CHANNEL

TECHNICAL FIELD

The present invention relates to a receiver for a radio network said receiver comprising a receiving unit and a channel estimation unit arranged to determine a channel estimate for a user.

The present invention also relates to a method for determining a channel estimate for a radio channel for a user based on known pilots in received signals.

BACKGROUND

In modern cellular radio systems, the radio network has a strict control on the behaviour of the terminals in the network. Uplink transmission parameters, i.e. parameters for the transmission over a communication channel from a terminal (also called UE in WCDMA terminology) to a base station (also called node B in WCDMA terminology), to be controlled are for example frequency, timing, and power. The uplink transmission parameters are regulated via downlink control signalling from the base station to the terminal.

In order to enable control of the terminal, measurements on uplink signals are required. Determination of timing misalignment requires that the base station perform a comparison of the timing of the received signal with a reference clock signal from a reference clock in the base station. Timing misalignment is caused by unforeseen propagation delay and mutual drift between the reference clock in the base station and a clock in the terminal. Likewise, the determination of the transmit power requires determination of the signal power of the signals received in the base station in relation to a predetermined threshold. The received power is not only depending on transmit power of the terminal but also on signal attenuation during propagation. The latter will vary with time.

Uplink radio communication over the communication channel between the terminal and the base station is subjected to multi path propagation, fading, frequency errors, round trip propagation times etc. This uplink communication channel is often referred to as an air interface. It is common that bit errors and block errors arise in information transmitted via said air interface. An uplink receiver of a base station is arranged so as to reduce bit error and block error rates. One essential part of a base station receiver is a channel estimation unit arranged to estimate the uplink communication channel.

Whenever a DFT (implemented as an FFT) is used by the base station receiver on a time domain signal, said time domain signal is assumed to be periodic with period time equal to the length of the DFT. In order to ensure this for signals subject to dispersive channels, a cyclic prefix can be used. The cyclic prefix must have a length that is larger, or equal to, the delay spread of the uplink communication channel. Also, any timing misalignments should have lower resolution than the cyclic prefix. Thus, an algorithm for determination of timing misalignment has preferably a resolution which is lower than the length of this cyclic prefix.

SUMMARY

One problem with prior art channel estimation units is that the algorithms used therein have a high calculation complexity or require a large amount of precalculated values. One object of the present invention is to reduce this problem.

This has in accordance with one embodiment of the invention been achieved by means of a receiver for a radio network. The receiver comprises a receiving unit and a channel estimation unit. The receiving unit is arranged to receive a number of time domain signals forming a plurality of symbols, each symbol having a cyclic prefix. The channel estimation unit is arranged to determine a channel estimate in the time domain for a user based on known pilots in the signals received by the receiving unit, and to determine the channel estimate for a user using a DFT matrix with a fundamental period related to the number of sub-carriers associated to said user, wherein the channel estimate has a length of L taps, L being less that the number of sub-carriers associated to said user.

One advantage with the present invention is that the channel estimation unit is designed so as to be implementation friendly, i.e. both the number of calculations and the number of pre-calculated values are kept low.

The receiver is in one example provided in a base station but it can also be implemented in a terminal or other equipment.

In accordance with one embodiment of the invention, the channel estimation unit comprises a channel estimation part arranged to estimate the channel estimate as $\hat{h}_{os} = V^*_{N_c \cdot k} D^*_u R_u$. In one example, the fundamental period $(N_c \cdot k)$ is equal to the number of sub-carriers associated to the user multiplied with an over-sampling factor k. If the over-sampling factor k is >1, an over-sampled channel model is provided, which implies an even more improved performance.

In accordance with one embodiment of the invention, the number of rows in the DFT matrix (V) is equal to the length L of a search window. However, the number can be even more reduced by a channel tap reduction part arranged to select a sub-set of rows in the channel estimate $\hat{h}_{os} = V^*_{N_c \cdot k} D^*_u R_u$ so as to form a channel tap reduced estimate $\hat{h}_{os\_red}$. The channel tap reduction part is in one example arranged to determine a first end point $\hat{m}_R$ and a second end point $\hat{m}_L$ within the search window for the channel estimate $\hat{h}_{os}$ and to select the sub-set of rows so that the channel tap reduced channel estimate $\hat{h}_{os\_red}$ only comprises rows between the first and second end points. In accordance therewith, the channel tap reduction part comprises in one example a first adaptive channel estimator arranged to determine the first end point $\hat{m}_R$ by determining a decision value for each of a number of possible lengths of the channel estimate $\hat{h}_{os}$ in a first direction and selecting the length associated to the most favourable decision value, and a second adaptive channel estimator arranged to determine the second end point $\hat{m}_L$ by determining a decision value for each of a number of possible lengths of the channel estimate in a second direction and selecting the length associated to the most favourable decision value.

The above described channel tap reduction unit enables timing misalignment determination. Accordingly the receiver comprises a timing misalignment determination unit arranged to determine a timing misalignment between the determined timing of the channel estimate $\hat{h}_{os}$ and an expected timing of the channel estimate $\hat{h}_{os}$ defined by the starting value $(N_{start})$. The timing misalignment determination unit is in one example arranged to determine the timing misalignment based on an expected relation between the starting sample value $(N_{start})$ and the first and/or the second end point. In using said timing misalignment determination unit, the timing misalignment can be determined with high accuracy.

The receiver is in one embodiment arranged to work in accordance with release 8 of the UMTS standard.

The present invention further comprises a method for determining a channel estimate for a radio channel in accordance with any of the appended claims. The present invention also relates to a method for timing misalignment determination based on a channel tap removal procedure as defined in the claims.

The present invention will now be described as an example with reference to the appended drawing.

BRIEF DESCRIPTION OF THE DRAWINGS

FIG. 9 is a block scheme over a channel tap reduction part in the channel estimation unit in FIG. 5.

DETAILED DESCRIPTION

Figure 1:
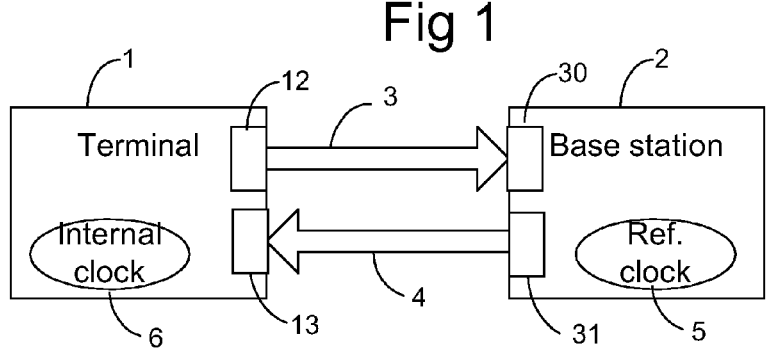
FIG. 1 shows schematically an example of a terminal and a base station in a radio network.

In FIG. 1, a cellular radio system comprises a number of terminals 1 (only one is shown in the Figure) and a base station 2. A radio network has strict control on the behaviour of the terminals 1 in the network. The terminal 1 is referred to as user equipment (UE) in WCDMA terminology. The base station is referred to as node B in WCDMA terminology. The terminal comprises a transmission part 12 arranged to process signals so as to be ready for transmission over a communication channel 3 from the terminal 1 to the base station 2. The transmission part will be described more in detail below. Uplink transmission parameters, i.e. parameters for the transmission over the communication channel 3 from the terminal 1 to the base station 2 to be controlled by the radio network are for example frequency, timing, and power.

The base station comprises a receiver 30 arranged receive uplink transmissions and a transmitter 31 to transmit downlink transmissions. The uplink transmission parameters are regulated via downlink control signalling from the base station to the terminal via a downlink communication channel 4. The terminal comprises further a reception part 13 arranged to receive said downlink transmissions.

In order to enable control of the terminal 1, measurement on uplink signals is required. Determination of timing misalignment requires that the base station perform a comparison of the timing of the received signal with a reference clock signal from a reference clock 5 in the base station. Timing misalignment is caused by unforeseen propagation delay and mutual drift between the reference clock 5 in the base station 2 and an internal clock 6 in the terminal 1. Likewise, the determination of the transmit power requires determination of the signal power of the signals received in the base station 2 in relation to a predetermined threshold. The received power is not only depending on transmit power of the terminal 1 but also on signal attenuation during propagation. The latter will vary with time.

Figure 2:
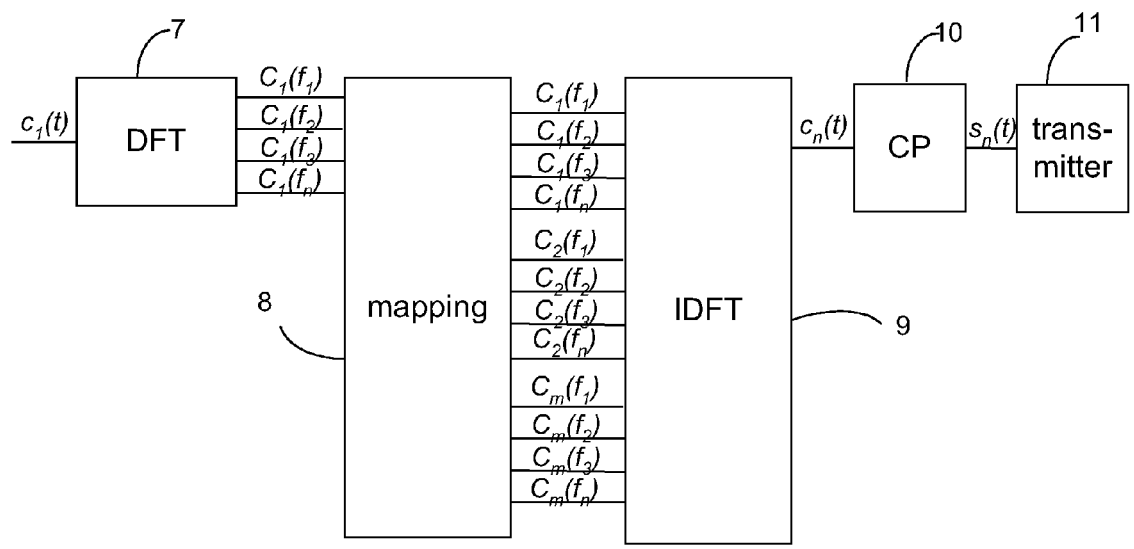
FIG. 2 is a block scheme over an example of a transmitting part of the terminal in FIG. 1.

In FIG. 2, a transmitting part 12 of the terminal 1 comprises a DFT converter 7 arranged to transform a signal $c_1(t)$ in the time domain into a discrete frequency domain signal $C_1$. The subscript "1" indicates that the signal relates to a user 1 associated to the terminal. The frequency domain signal is divided into a number of sub-carrier signals $C_1(f_1)$, $C_1(f_2)$, $C_1(f_3)$, ..., $C_1(f_n)$. The DFT converter is characteristically arranged to divide frequency signal into 12-1200 sub-carriers. The number of sub-carriers used depends on the application and on the capacity of the terminal. The choice of number of sub-carriers will not be discussed herein. In accordance with one example, the DFT converter 7 is implemented as a Fast Fourier Transform (FFT).

The discrete frequency domain signal $C_1$ is fed to a mapping unit 8. The mapping unit 8 is arranged to receive discrete frequency domain signal $C_1$ from one user. The discrete frequency domain signal $C_1(f_1)$, $C_1(f_2)$, $C_1(f_3)$, ..., $C_1(f_n)$ is associated with a number of sub-carriers associated to said user. The base station 2 has information related to which sub-carriers are associated to said user. In the transmitting part 12 for the herein described user, all other sub-carriers for other users (2 to m) are set to zero. This mapping of sub-carriers is done such that there are no sub-carriers overlaps between the users. The mapping unit 8 is arranged to feed the mapped discrete frequency domain signal to an IDFT converter 9. The IDFT converter 9 is arranged to perform an inverse discrete transform operation on the received mapped frequency domain signal and to output a time domain signal $c_n(t)$. In accordance with one example, the IDFT converter 9 is implemented as an Inverse Fast Fourier Transform (IFFT).

The time domain signal $c_n(t)$ from the IDFT converter 9 is fed to a cyclic prefix unit 10. The cyclic prefix unit 10 is arranged to add a cyclic prefix to the time domain signal $c_n(t)$. With other words, the cyclic prefix unit is arranged to add a part from the end of the time domain signal $c_n(t)$ at the beginning of the time domain signal $c_n(t)$ so as to provide an output signal having a cyclic prefix $s_n(t)$. The length of the cyclic prefix is characteristically chosen such that it has a length larger than, or equal to, the delay spread of the uplink communication channel 3. The signal having a cyclic prefix $s_n(t)$ outputted from the cyclic prefix unit is fed to a radio transmitter 11 for transmission.

Figure 3:
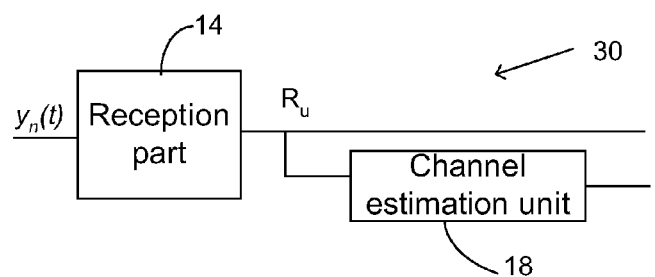
FIG. 3 is a block scheme over an example of a receiver of the base station in FIG. 1.

In FIG. 3, a receiver of the base station 2 comprises a reception part and a channel estimation unit 18. The reception part 14 is arranged to extract data for each user in a received signal $y_n(t)$. Uplink radio communication over the communication channel 3 between the terminal 1 and the base station 2 is subjected to multi path propagation, fading, frequency errors, round trip propagation times etc. This uplink communication channel 3 is often referred to as an air interface. It is common that bit errors and block errors arise in information transmitted via said air interface. The uplink receiver of the base station 2 is arranged so as to reduce bit error and block error rates. One essential part of the base station receiver is the channel estimation unit 18 arranged to estimate the uplink communication channel 3.

Figure 4:
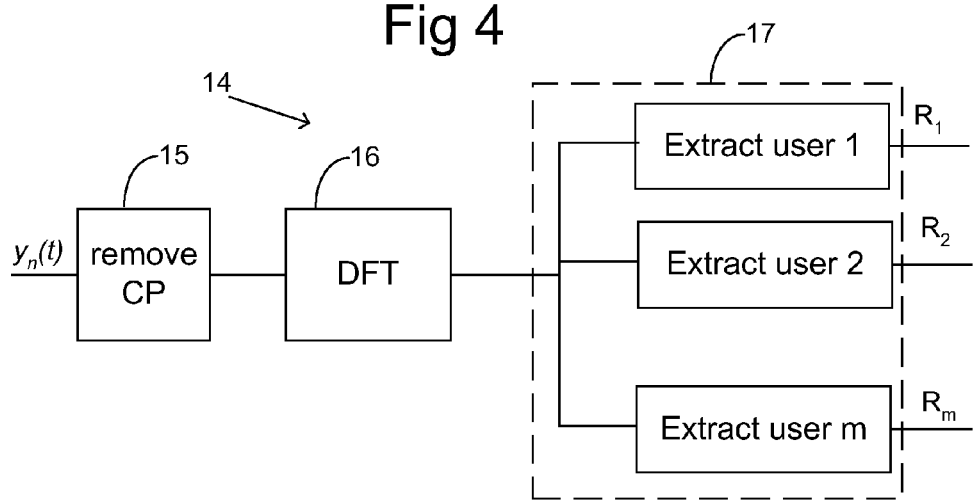
FIG. 4 is a block scheme over an example of a reception part of the receiver in FIG. 3

In FIG. 4, the reception part 14 of the receiver 30 is arranged to receive the signal $y_n(t)$ transmitted over the uplink communication channel 3. The cyclic prefix is removed from the received signal $y_n(t)$ in a unit 15 arranged to remove said cyclic prefix. The removing cyclic prefix unit 15 is connected to a DFT converter 16 arranged to transform the received signal in the time domain into a discrete frequency domain signal. In accordance with one example, the DFT converter 7 is implemented as a Fast Fourier Transform (FFT). The DFT converter 16 is connected to an extraction unit 17. The extraction unit 17 is arranged to, for each user, extract that part of the signal which lies within a frequency range associated to said user. The extracted data is referred to as $R_u$ for a given user u.

Figure 5:
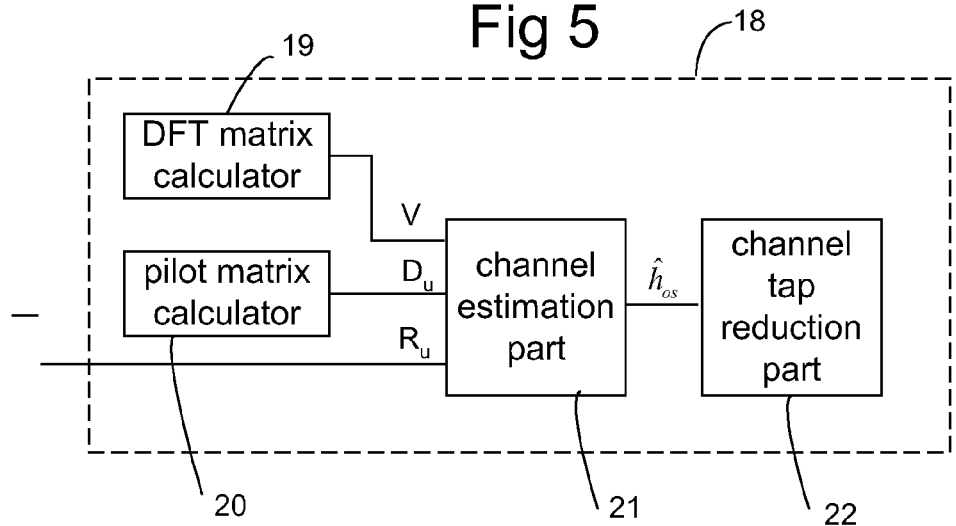
FIG. 5 is a block scheme over an example of a channel estimation unit in the receiver in FIG. 3.

In FIG. 5, the channel estimation unit 18 is arranged to receive samples $R_u$ containing known pilots. In this example, the received samples $R_u$ correspond to one reference SC-FDMA symbol of a current user with $N_c$ sub-carriers, and $N_r$ receiver antennas, which is a matrix of size $N_c \times N_r$. The channel estimator unit is arranged to determine a channel estimate for the uplink communication channel 3 based on the receive samples $R_u$ containing known pilots.

First, the theory behind the channel estimation proposed herein will be given. The received samples can be modelled as $$R_u = D_u V_N h + W,$$

wherein W is a matrix of size $N_c \times N_r$ with additive Gaussian noise, wherein h is a matrix of size $L \times N_r$, with a model of a time domain channel impulse response, where L is the number of taps of the channel, the model of the time domain channel impulse response with its associated number of channel taps will be discussed more in detail below, wherein $V_N$ is a DFT matrix of size $N_c \times L$, containing a DFT with fundamental period N; the subscript N is used to denote the fundamental period of the DFT. A suitable value of N is discussed below, and wherein $D_u$ is a diagonal matrix in the frequency domain of size $N_c \times N_c$ with the known pilots on its mail diagonal for a predetermined user u.

The DFT matrix equals $$V_N = \frac{1}{\sqrt{N}} \begin{bmatrix} 1 & 1 & \cdots & 1 \\ 1 & e^{-j2\pi/N} & & e^{-j2\pi(L-1)/N} \\ \vdots & & \ddots & \\ 1 & e^{-j2\pi(N_c-1)/N} & & e^{-j2\pi(N_c-1)(L-1)/N} \end{bmatrix}.$$

This DFT matrix is used, as will be understood from the following description, to design resolution, position and length of an estimate of the channel model h.

First, the value of N will be discussed. In order to avoid any overlapping folding when using this DFT matrix $V_N$, the fundamental period N must be larger, or equal to the number of allocated sub-carriers $N_c$, i.e. $N \geq N_c$.

However, an upper bound of the fundamental period N can be derived by considering a least square (LS) channel estimate. A least square (LS) estimate of the channel h equals $$\hat{h} = (V^*_N D^*_u D_u V_N)^{-1} V^*_N D^*_u R_u$$

wherein * denotes a complex conjugate and transpose (Hermite operator). We assume that the pilot symbols have unity magnitude in frequency domain, i.e. $D^*_u D_u = I$ where I is the identity matrix. Then, the estimate of the channel h can be written as:

$$\hat{h} = (V^*_N V_N)^{-1} V^*_N D^*_u R_u$$

Now, denote the $L \times L$ matrix $V^*_N V_N$, included in the least square channel estimate with $\Lambda = V^*_N V_N$, wherein an element in row r and column q of $\Lambda$ equals $$\Lambda(r,q) = \frac{1}{N} \sum_{k=0}^{N_c-1} e^{j2\pi(r-q)k/N}.$$

The off diagonal elements of $\Lambda$ are zero, i.e. $\Lambda(r,q)=0$ for $r \neq q$ if $N_c(r-q)/N = K$, wherein K is an integer. Accordingly, the matrix $\Lambda$ can be replaced with scalar constant if $N = N_c/K$. This is true for all choices of the number of channel taps L.

The combination of the requirement that $N \geq N_c$ (in order to avoid overlapping folding) and that $N = N_c/K$ (in order to replace $\Lambda$ with a scalar constant), gives that $N = N_c$.

When choosing $N = N_c$, $$\Lambda = \frac{1}{N_c} \begin{bmatrix} N_c & & 0 \\ & \ddots & \\ 0 & & N_c \end{bmatrix} = I$$

Accordingly, the estimate of the channel h can be written as $$\hat{h} = V^*_{N_c} D^*_u R_u.$$

However, the use of this channel estimate $\hat{h} = V^*_{N_c} D^*_u R_u$ has one drawback, which will be illustrated below.

Denote $\hat{H}_{MF}$ as an $N_c \times N_r$ matrix with a matched filter channel estimate in frequency domain such that $$\hat{H}_{MF} = D^*_u R_u$$

wherein the element in row k (corresponding to a frequency index) and column r (corresponding to a receiver antenna) is denoted by $\hat{H}_{MF}(k,r)$.

A time domain channel estimate without any reduction in the number of channel taps is achieved by applying an inverse DFT matrix $V^*_N$ of size $N_c \times N_c$ to the matched filter in the frequency domain. This matched filter channel estimate in time domain is an $N_c \times N_r$ matrix which is denoted $$\hat{h}_{MF} = V^*_N D^*_u R_u$$

wherein element in row m (corresponding to a time index) and column r (corresponding to a receiver antenna) equals $$\hat{h}_{MF}(m,r) = \frac{1}{\sqrt{N}} \sum_{k=0}^{N_c-1} e^{j2\pi km/N} \hat{H}_{MF}(k,r)$$

for $M = 0, K, N_c - 1$ and $r = 0, K, N_r - 1$. Note that this channel estimate has $N_c$ channel taps, i.e. no reduction in the number of channel taps is done. Selecting L channel taps in time domain can be expressed as applying a rectangular window to the matched filter channel estimate as $$\hat{h}(m,r) = w(m) \hat{h}_{MF}(m,r)$$

wherein $$w(m) = \begin{cases} 1 & \text{for } m = 0, \ldots, L-1 \\ 0 & \text{otherwise} \end{cases}$$

As described earlier, the selection of L taps is made by using an inverse DFT matrix $V^*_N$ of size $L \times N_c$ instead of $N_c \times N_c$. The selection of L taps is in one example made by applying a window to the matched filter $\hat{h}_{MF}$ as described above.

Figure 6:
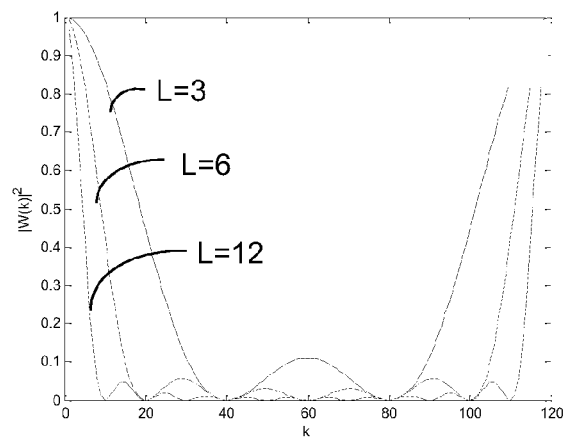
FIG. 6 is a graph schematically illustrating a frequency response for a channel estimate according to a first example of the invention.

In FIG. 6, a frequency domain interpretation of the windowing is illustrated. In the shown Figure, $N_c=120$, $N=N_c$ and $L=3$, 6 and 12. As can be seen from the figure, the channel at large values of the sub-carrier indices impact the channel estimate at sub-carrier index zero. Here an estimated channel, where the number of channel taps is reduced in time domain, will have a frequency response in which the value for the largest sub-carrier index will be approximately equal to the value for the lowest sub-carrier index. This is obviously an unwanted constraint on the estimated channel. One exception is a one tap channel having a flat frequency response, wherein the circular convolution naturally provides no constraint. However, for all other channels, this circular convolution is undesired.

In order to overcome this drawback, the time domain channel estimate is interpolated prior to reducing the number of channel taps and after conversion to frequency domain. The introduction of said interpolation reduces the impact of circular convolution. One way of providing time domain interpolation is to convert an impulse response to frequency domain, add zero padding, and then perform transformation back to time domain, prior to reducing the number of channel taps. In detail and expressed in matrix notations, this interpolated channel estimate is expressed as $$\hat{h}_{os} = V^*_{N_c K_{OS}} V_{N_c} \hat{h}_{MF}$$

wherein $$V_{N_c} = \frac{1}{\sqrt{N_c}} \begin{bmatrix} 1 & 1 & \cdots & 1 \\ 1 & e^{-j2\pi/N_c} & & e^{-j2\pi(N_c-1)/N_c} \\ \vdots & & \ddots & \\ 1 & e^{-j2\pi(N_c-1)/N_c} & & e^{-j2\pi(N_c-1)(N_c-1)/N_c} \end{bmatrix}$$

is a DFT matrix with fundamental period $N_c$, and wherein $$V_{N_c K_{os}} = \frac{1}{\sqrt{N_c K_{os}}} \begin{bmatrix} 1 & 1 & \cdots & 1 \\ 1 & e^{-j2\pi/N_c K_{os}} & & e^{-j2\pi(N_c K_{os}-1)/N_c K_{os}} \\ \vdots & & \ddots & \\ 1 & e^{-j2\pi(N_c K_{os}-1)/N_c K_{os}} & & e^{-j2\pi(N_c K_{os}-1)^2/N_c K_{os}} \end{bmatrix}$$

such that $V^*_{N_c K_{OS}}$ is an inverse DFT matrix with fundamental period $N_c K_{OS}$, wherein $K_{OS}$ denotes an over-sampling factor. Inserting the previously described least square channel estimate, results in $$\hat{h}_{os} = V^*_{K_{OS} N_c} V_{N_c} V^*_{N_c} D^*_u R_u = V^*_{K_{OS} N_c} D^*_u R_u$$

Figure 7:
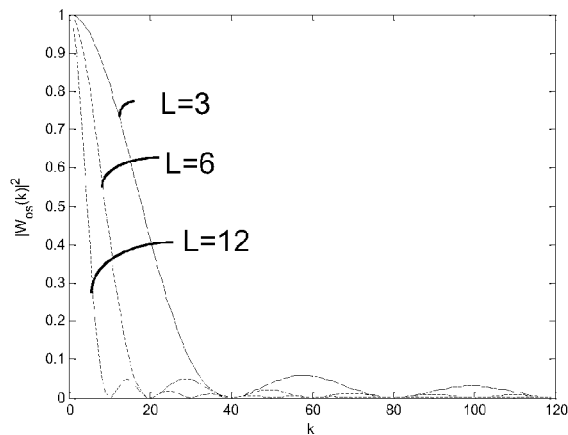
FIG. 7 is a graph schematically illustrating a frequency response for a channel estimate according to a second example of the invention.

In FIG. 7, a frequency domain interpretation of this interpolated channel estimate $\hat{h}_{os}$ is illustrated. In the shown Figure, $N=K_{OS} \cdot N_c$, $N_c=120$, $K_{OS}=2$ and $L=3$, 6 and 12. As can be seen from the figure, the impact from the sub-carriers with large indices on the interpolated channel estimate at low sub-carrier indices is very small. The over-sampling factor $K_{OS}$ lies in one example within the range 1.5 to 2.5.

As is understood from the above, the introduction of the over-sampling factor $K_{OS}$, implies that an approximation has been introduced to the channel estimate. We make the assumption that $$\Lambda = \frac{1}{N_c} \begin{bmatrix} N_c & & 0 \\ & \ddots & \\ 0 & & N_c \end{bmatrix} = I$$

even though this is only truth for $N=N_c$. However, relatively small error is introduced with this approximation.

Accordingly, the following channel estimate is proposed $$\hat{h}_{os} = V^*_{K_{OS} N_c} D^*_u R_u,$$

wherein a reduction in the number of channel taps from the previously chosen length L of the search window can be done by simply selecting rows out of $\hat{h}_{os}$. The number of channel taps can be chosen in relation to the maximum delay spread of the used channel estimate. Note that multiplication with the diagonal matrix $D^*_u$ is done with only $N_c$ complex multiplications and that multiplication with $V^*_{K_{OS} N_c}$ might be implemented by using an inverse fast Fourier transform (IFFT) with fundamental period $K_{OS} N_c$, where only $N_c$ input values are non-zero.

Thus, the channel estimation unit 18 in FIG. 5 comprises a DTF matrix calculator 19. The DTF matrix calculator 19 is arranged to calculate the DFT matrix as $$V_{N_c K_{os}} = \frac{1}{\sqrt{N_c K_{os}}} \begin{bmatrix} 1 & 1 & \cdots & 1 \\ 1 & e^{-j2\pi/N_c K_{os}} & & e^{-j2\pi(N_c K_{os}-1)/N_c K_{os}} \\ \vdots & & \ddots & \\ 1 & e^{-j2\pi(N_c K_{os}-1)/N_c K_{os}} & & e^{-j2\pi(N_c K_{os}-1)^2/N_c K_{os}} \end{bmatrix}$$

with a fundamental period $N_c K_{OS}$. The channel estimation unit 18 further comprises a pilot matrix calculator 20 arranged to form a pilot matrix $D_u$. The pilot matrix $D_u$ is a diagonal matrix in the frequency domain of size $N_c \times N_c$ with the known pilots on its mail diagonal for a predetermined user u. A channel estimation part 21 is arranged to provide a channel estimate $\hat{h}_{os}$. Accordingly, the channel estimation part 21 is arranged to form a complex conjugate and transpose (Hermite operator) $V^*_{K_{OS} N_c}$ to the DFT matrix provided by the DTF matrix calculator 19. The channel estimation part 21 is further arranged to form a complex conjugate and transpose (Hermite operator) to the pilot matrix $D_u$ provided by the pilot matrix calculator 20. Thereafter, the channel estimation part 21 is arranged to calculate the channel estimate as $\hat{h}_{os} = V^*_{K_{OS} N_c} D^*_u R_u$. In one example, the channel estimation part 21 is arranged to feed the channel estimate $\hat{h}_{os}$ to a channel tap reduction part 22. The channel tap estimator 22 is applicable to channels estimated in any way, not only to the channel estimation herein described.

A procedure used by the channel tap reduction part 22 for reducing the number of channel taps based on the maximum delay spread of a channel response estimated using the channel estimate $\hat{h}_{os}$ will be described below.

Figure 8:
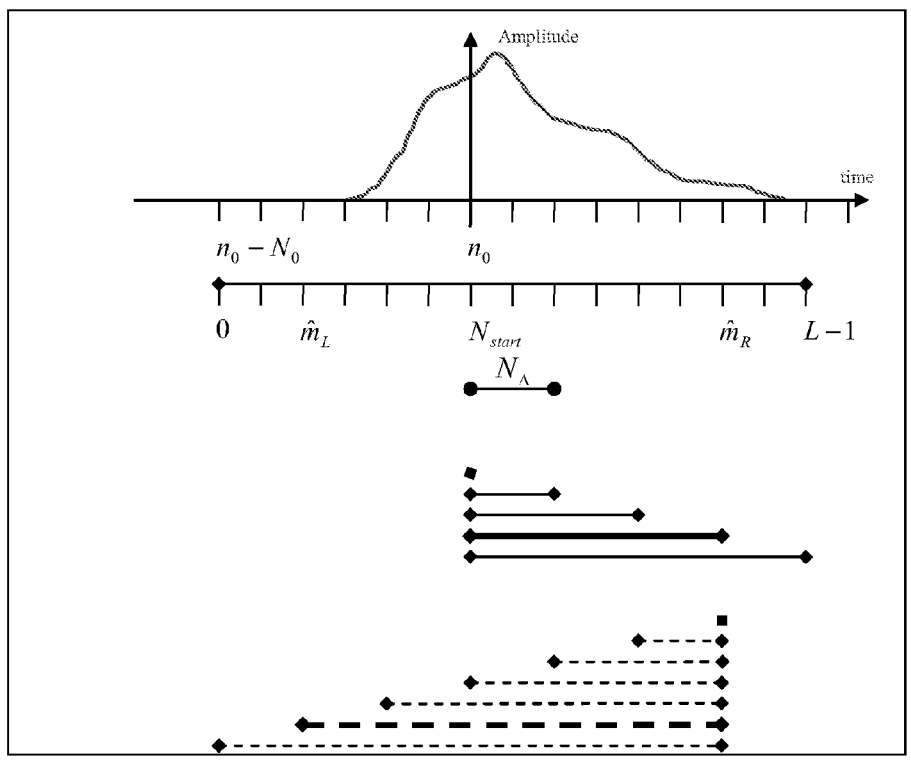
FIG. 8 shows schematically an example of a principle used by a channel tap reduction part in the channel estimation unit in FIG. 5.

In FIG. 8, position and length of the channel estimate $\hat{h}_{os}$ are determined in two stages of adapting channel tap positions. First, an end point $\hat{m}_R$, for the channel is estimated by adjusting the length of the channel at the right hand side from a starting position $N_{start}$ of the impulse response, while keeping the starting position $N_{start}$ constant. Then in a second stage, a start point $\hat{m}_L$ for the channel at the left hand side of the impulse response is adjusted while keeping the end point $\hat{m}_R$, constant.

In alternative example (not shown) the start point $\hat{m}_L$ is first determined by adjusting the length of the channel at the left hand side from a starting position $N_{start}$ of the impulse response, while keeping the position $N_{start}$ constant. Then in a second stage, the end point $\hat{m}_R$ for the channel at the right hand side of the impulse response is adjusted while keeping the start point $\hat{m}_L$ constant.

The starting point $\hat{m}_L$ and the end point $\hat{m}_R$ are in one example chosen such that a predetermined amount of the energy in the impulse response lies within the range between the starting point $\hat{m}_L$ and end point $\hat{m}_R$. In another example, the starting point $\hat{m}_L$ and end point $\hat{m}_R$ is chosen such that amplitudes of the impulse response $\hat{h}_{os}$ outside the range between the starting point $\hat{m}_L$ and the end point $\hat{m}_R$ are below a predetermined value.

FIG. 9 shows an example of an implementation of a scheme for determining the starting point $\hat{m}_L$ and the end point $\hat{m}_R$ is implemented in the channel tap reduction part 22. A matched filter estimator 23 is arranged to calculate a matched filter channel estimate in time domain. The matched filter channel estimate is calculated as $\hat{h}_{MF} = V^*_{K_{OS}N_c^f} D^*_u R_u$. This matched filter estimate corresponds to the previously described channel estimate $\hat{h}_{os}$.

A covariance matrix calculator 24 is arranged to calculate a covariance matrix $P_Y$ for the received signal $\hat{h}_{os}$. The covariance matrix $P_Y$ of the received signal is calculated as $P_y(s) = R^*_u R_u$. The covariance matrix $P_Y$ is a Hermitian matrix, and accordingly only half of the off-diagonal elements have to be calculated.

An adaptive channel estimator to right 25 is arranged to determine the end point $\hat{m}_R$ based on the matched filter channel estimate $\hat{h}_{MF}$ from the matched filter estimator 23 and the covariance matrix $P_Y$ from the covariance matrix calculator 24. The adaptive channel estimator to right 25 is arranged to vary an end index $m_R$ while keeping a starting index $N_{start}$ constant. The starting index $N_{start}$ is a design parameter, which will be described more in detail below. Values of the end index $m_R$ which are evaluated are all integers between $N_{start}$ and $L-1$ with a step of $N_\Delta$, wherein $N_\Delta$ denotes a resolution used in determining the end point $\hat{m}_R$.

The adaptive channel estimator to right 25 is arranged to calculate a residual noise covariance matrix $Q_R$ as $$Q_R(m_R, r, q) = K_{Scale} P_Y(r, q) - \sum_{m=N_{start}}^{m_R} (h_{MF}(m,r))^* h_{MF}(m,q)$$

or, with matrix notation $$Q_R(m_R) = K_{Scale} P_Y - h^*_0 h_0,$$

wherein $$h_0 = \begin{bmatrix} \hat{h}_{MF}(N_{start}, 0) & \cdots & \hat{h}_{MF}(N_{start}, N_r - 1) \\ \hat{h}_{MF}(N_{start}+1, 0) & & \hat{h}_{MF}(N_{start}+1, N_r - 1) \\ \vdots & & \vdots \\ \hat{h}_{MF}(m_R - 1, 0) & & \hat{h}_{MF}(m_R - 1, N_r - 1) \\ \hat{h}_{MF}(m_R, 0) & \cdots & \hat{h}_{MF}(m_R, N_r - 1) \end{bmatrix}.$$

In one example, the residual noise covariance matrix $Q_R$ is calculated in a recursive fashion. In accordance with this example, $$Q_R(N_{start}, r, q) = K_{scale} P_Y(r,q) - (h_{MF}(N_{start}, r))^* h_{MF}(N_{start}, q)$$

and $$Q_R(m_R, r, q) = Q_R(m_R - 1, r, q) - (h_{MF}(m_R, r))^* h_{MF}(m_R, q)$$

for $m_R > N_{start}$.

Accordingly, only one complex multiplication is required for calculating the residual noise matrix $Q_R$. Further, the residual noise covariance matrix $Q_R$ is a Hermitian matrix, whereby only half of the off diagonal elements need to be calculated.

Thereafter, the adaptive channel estimator to right 25 is arranged to calculate a decision value $\beta_{right}$ for each possible end index $m_R$ between $N_{start}$ and $L-1$ with a step of $N_\Delta$ based on the residual noise covariance matrix $Q_R$. The decision value $\beta_{right}$ is in one example calculated as $$\beta_{right}(m_R) = |Q_R(m_R)|(A_{AIC}(m_R - N_{start}+1))^{N_r},$$

wherein $|Q_R(m_R)|$ denotes the determinaant of the residual noise covairance matrix $Q_R(m_R)$ and wherein $$A_{AIC}(m_R - N_{start} + 1) = \frac{1}{N_c} \exp\left\{ K_{AIC} \frac{m_R - N_{start} + 1}{N_c} \right\}$$

is an Akaike like channel length punishment factor, with a design variable $K_{AIC}$. In one example, the design variable is set to $K_{AIC} = 2$, whereby the classical Akaike Information Criterion follows. However, by increasing this design variable $K_{AIC}$, a more conservative channel length selection can be achieved.

In an example with two receiver antennas, the determinant of the covariance matrix equals $$|Q_R(m_R)| = \left\| \begin{matrix} \sigma_0^2 & \rho_{01} \\ \rho_{01}^* & \sigma_1^2 \end{matrix} \right\| = \sigma_0^2 \sigma_1^2 - |\rho_{01}|^2.$$

The determinant is non-negative and real valued.

When a decision value $\beta_{right}$ has been calculated for each end index $m_R$, the value of that end index $m_R$ which corresponds to the lowest value of the decision value $\beta_{right}$ is determined as the end point $$\hat{m}_R = \underset{m_R}{\operatorname{argmin}} \{\beta_{right}(m_R)\}.$$

A adaptive channel estimator to left 26 is arranged to determine the start point $\hat{m}_L$ based on the matched filter channel estimate $\hat{h}_{MF}$ from the matched filter estimator 23, the covariance matrix $P_Y$ from the covariance matrix calculator 24 and the end point $\hat{m}_R$ from the adaptive channel estimator to right 25. The adaptive channel estimator to left 26 is arranged to vary the start index $m_L$ while keeping the end point $\hat{m}_R$ constant. Thus, values of the start index which will be evaluated are all integers between 0 and the end point $\hat{m}_R$, with a step of $N_\Delta$, wherein $N_\Delta$ denotes a resolution used in determining the start point $\hat{m}_L$.

The adaptive channel estimator to left 26 is arranged to calculate a residual noise covariance matrix $Q_L$ as $$Q_L(m_L, r, q) = K_{Scale} P_Y(r, q) - \sum_{m=m_L}^{\hat{m}_R} (h_{MF}(m, r))^* h_{MF}(m, q)$$

or with matrix notation as $Q_L(m_L) = K_{Scale} P_Y - h^*_0 h_0$, wherein $$h_0 = \begin{bmatrix} \hat{h}_{MF}(m_L, 0) & \cdots & \hat{h}_{MF}(m_L, N_r-1) \\ \hat{h}_{MF}(m_L+1, 0) & & \hat{h}_{MF}(m_L+1, N_r-1) \\ \vdots & & \vdots \\ \hat{h}_{MF}(\hat{m}_R-1, 0) & & \hat{h}_{MF}(\hat{m}_R-1, N_r-1) \\ \hat{h}_{MF}(\hat{m}_R, 0) & \cdots & \hat{h}_{MF}(\hat{m}_R, N_r-1) \end{bmatrix}.$$

In one example, the residual noise matrix $Q_L$ is calculated in a recursive fashion. Accordingly, the residual noise matrix $Q_L$ is calculated as $$Q_L(\hat{m}_R, r, q) = K_{scale} P_Y(r, q) - (h_{MF}(\hat{m}_R, r))^* h_{MF}(\hat{m}_R, q)$$

and $$Q_L(m_L, r, q) = Q_L(m_L+1, r, q) - (h_{MF}(m_L, r))^* h_{MF}(m_L, q)$$

for $m_L < \hat{m}_R$.

Accordingly, only one complex multiplication is required for calculating the residual noise matrix $Q_L$. Further, the residual noise covariance matrix $Q_L$ is a Hermitian matrix, whereby only half of the off diagonal elements need to be calculated.

Thereafter, the adaptive channel estimator to left 26 is arranged to calculate a decision value $\beta_{left}$ for each possible start index $m_L$ between 0 and the end point $\hat{m}_R$ with a step of $N_\Delta$ based on the residual noise covariance matrix $Q_L$. The decision value $\beta_{left}$ is in one example calculated as $$\beta_{left}(m_L) = |Q_L(m_L)|(A_{AIC}(\hat{m}_R - m_L + 1))^{N_r}$$

When a decision value $\beta_{left}$ has been calculated for each start index $m_L$, the value of that start index $m_L$ which corresponds to the lowest value of the decision value $\beta_{left}$ is determined as the start point $$\hat{m}_L = \underset{m_L}{\operatorname{argmin}}\{\beta_{left}(m_L)\}.$$

A channel tap reducer 27 is arranged to provide a channel tap reduced channel estimate $\hat{h}_{os\_red}$ based on the channel estimate $\hat{h}_{os}$ provided by the channel estimation part 21 of the channel estimation unit 18 and based on the start point $\hat{m}_L$ estimated by the adaptive channel tap estimator to left 26 and the end point $\hat{m}_R$ estimated by the adaptive channel tap estimator to right 25. The channel tap reducer 27 is arranged to provide the channel tap reduced channel estimate $\hat{h}_{os\_red}$ by removing the rows in the channel estimate lying outside the range given by the start point $\hat{m}_L$ and the end point $\hat{m}_R$.

In one example, the receiver comprises a frequency domain equalizer of the user data symbols. This can be the case when the user data symbols for example are SC-FDMA symbols. In accordance with this example, a DTF converter 28 is arranged to calculate a channel estimate $\hat{H}$ in then frequency domain based on the channel tap reduced channel estimate $\hat{h}_{os\_red}$ from the channel tap reducer 27. Thus, DFT converter 28 is arranged to transform the time domain channel estimate to the frequency domain as $$\hat{H}(k, r) = \sum_{m=\hat{m}_L}^{\hat{m}_R} e^{-j2\pi k(m-N_0)/(K_{OS}N_c)} h_{MF}(m, r)$$

for frequency indices $k=0, K, N_c-1$, and for receiver antennas $r=0, K, N_r-1$.

A timing misalignment calculator 29 is arranged to determine a timing misalignment between an expected channel tap reduced channel estimate $\hat{h}_{os\_red,exp}$ and the currently calculated channel tap reduced channel estimate $\hat{h}_{os\_red}$.

Before discussing the timing misalignment calculations in detail, the starting index $N_{start}$ used by the adaptive channel estimator to right 25 will be discussed. In one example, the starting index $N_{start}$ represents the expected timing of the reception of the channel response. Accordingly, the starting index $N_{start}$ is chosen in relation to an expected start point $\hat{m}_{L,exp}$. For example, the starting index $N_{start}$ can be chosen as $N_{start} = \hat{m}_{L,exp}$. In another example, the starting index $N_{start}$ is chosen as $N_{start} = \hat{m}_{L,exp} + konst$, wherein konst represents a preset constant or a constant set based on the length of the channel estimate with a reduced number of channel taps.

The timing misalignment calculator 29 is in one example relating to the choice of starting index discussed above, arranged to determine the timing misalignment substantially based on a time difference between the expected start point $\hat{m}_{L,exp}$ and the determined start point start point $\hat{m}_L$. The timing misalignment information is fed to a transmission unit 31 arranged to transmit said information to a user for which channel estimate was calculated. A reception unit 13 of a terminal 1 associated to said user is arranged to receive the timing misalignment information. The terminal 1 is further arranged to adjust the timing of its transmission based on said timing misalignment information.

Figure 10:
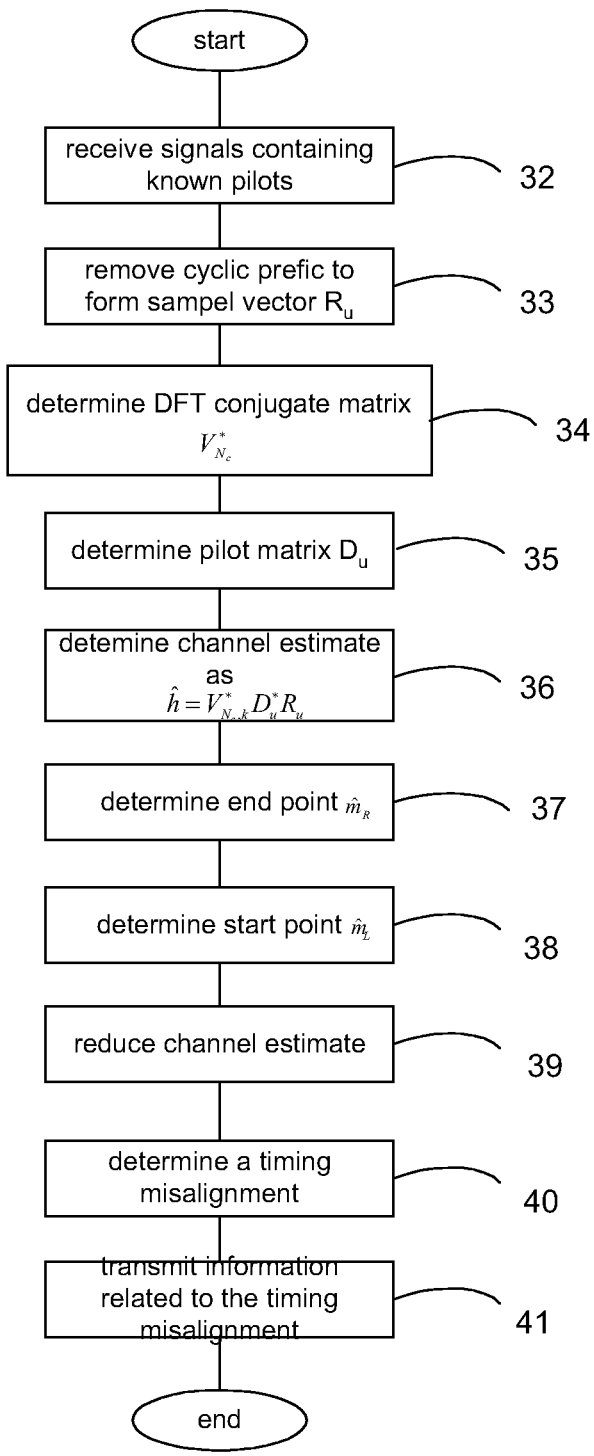
FIG. 10 is a flow chart over an example of a method for determining a channel estimate for a radio channel

In FIG. 10, an illustration is given of a method for determining a channel estimate $\hat{h}_{os}$ for a radio channel, which comprises the following steps. In an first step 32, a number of time domain signals $(y_n)$ are received, wherein the signals form a plurality of symbols, each symbol having a cyclic prefix. In a second step 33, the received signals $(y_n)$ are processed so as to remove the prefix and form a vector $(R_u)$ of received samples. In a third step 34, a conjugate $V^*_{N_c}$ of a DFT matrix (V) having a fundamental period of $N_c, k$ is determined. In a fourth step, 35, a conjugate $D^*_u$ of a pilot matrix $D_u$, comprising pilot symbols in the frequency domain corresponding to said user (u) is determined. The third 34 and fourth step 35 can be performed in arbitrary order. In a fifth step, a channel estimate is determined as $\hat{h} = V^*_{N_c, k} D^*_u R_u$. A channel estimate has now need provided, wherein the number of calculations and pre-calculated values is low.

However, the size of the channel estimate can be even further reduced by selecting a subset of rows from the channel estimate $\hat{h} = V^*_{N_c, k} D^*_u R_u$ matrix so as to form a channel tap reduced channel estimate $\hat{h}_{os\_red}$, as described in a sixth 37, seventh 38 and eighth 39 step. In the sixth step 37, an end point end point $\hat{m}_R$ for the channel tap reduced channel estimate $\hat{h}_{os\_red}$ is estimated. The estimation involves in one example determining a decision value for each of a number of possible lengths of the channel estimate $\hat{h}_{os}$ in a right direction starting from a starting sample value $N_{start}$ and selecting that length which is associated to the most favourable decision value. In the seventh step 37, a start point $(\hat{m}_L)$ for the channel tap reduced channel estimate $\hat{h}_{os\_red}$ is estimated. In one example, the estimation involves determining a decision value for each of a number of possible lengths of the channel estimate $\hat{h}_{os}$ in a left direction and selecting that length which is associated to the most favourable decision value. The lengths are in one example related to the estimated end point $\hat{m}_R$. In the eighth step 39, channel estimate is reduced so as to only comprise comprises rows between the start point and the end point.

In one example, a timing misalignment between an expected timing of the channel tap reduced channel estimate and the determined channel tap reduced channel estimate ($\hat{h}_{os\_red}$) is determined in a ninth step 40. The information relating to the timing misalignment is in one example transmitted to the user (u) in a tenth step 41.

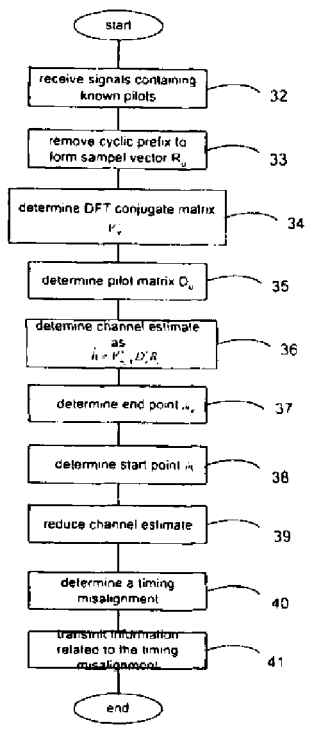

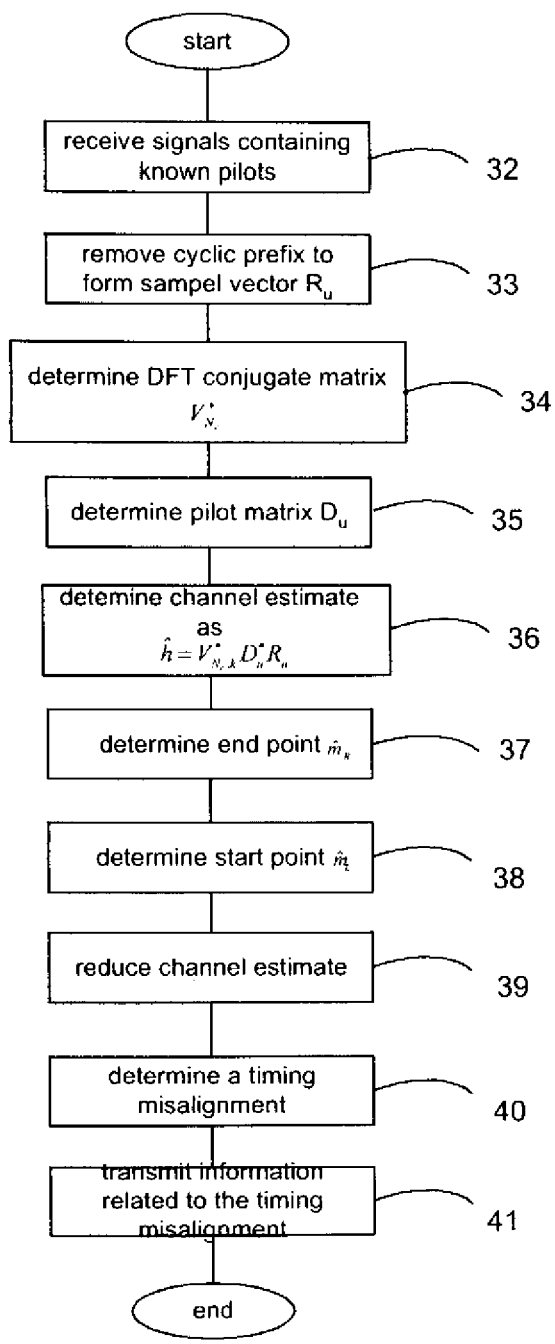

The invention claimed is:

1. A receiver for a radio network, said receiver comprising
a receiving unit for receiving a number of time domain signals forming a plurality of symbols, each symbol having a cyclic prefix,
a channel estimation unit for determining a channel estimate ($\hat{h}_{os}$) in the time domain for a user (u) based on known pilots in the signals received by the receiving unit,
wherein the channel estimation unit determines the channel estimate ($\hat{h}_{os}$) for a user (u) using a DFT matrix (V) with a fundamental period related to the number ($N_c$) of sub-carriers associated to said user (u), wherein the channel estimate ($\hat{h}_{os}$) has a length of L taps, L being less that the number ($N_c$) of sub-carriers associated to said user:
wherein the channel estimation unit com rises a channel estimation part for estimating the channel estimate as $\hat{h}_{os} = V^*_{N_c \cdot k} D^*_u R_u$;
wherein $V^*_{N_c \cdot k}$ is the conjugate transpose of a OFT matrix having a fundamental period of $N_c \cdot k$;
wherein $D^*_u$ is the conjugate transpose of $D_u$, which is a matrix comprising pilot symbols in the frequency domain corresponding to said user (u);
wherein $R_u$ denote received samples in the frequency domain for said user (u):
and wherein k is a constant.

2. The receiver according to claim 1, wherein the fundamental period ($N_c \cdot k$) is equal to the number of sub-carriers $N_c$ associated to the user multiplied with an over-sampling factor k.

3. The receiver according to claim 2, wherein the over-sampling factor k is within a range from 1.0 to 2.5.

4. The receiver according to claim 3, wherein the over-sampling factor k is 2.

5. The receiver according to claim 1, wherein the number of rows in the DFT matrix (V) is equal to the length L of a search window.

6. The receiver according to claim 5, wherein the channel estimation unit comprises a channel tap reduction part for selecting a subset of rows in the channel estimate $\hat{h}_{os} = V^*_{N_c \cdot k} D^*_u R_u$ so as to form a channel tap reduced estimate $\hat{h}_{os\_red}$.

7. The receiver according to claim 6, wherein the channel tap reduction part determines a first end point ($\hat{m}_R$) and a second end point ($\hat{m}_L$) within the search window for the channel estimate ($\hat{h}_{os}$) and selects the sub-set of rows so that the channel tap reduced estimate ($\hat{h}_{os\_red}$) only comprises rows between the first and second end points.

8. The receiver according to claim 7, wherein the channel tap reduction part comprises:
a first adaptive channel estimator for determining the first end point ($\hat{m}_R$) by determining a decision value for each of a number of possible lengths of the channel estimate ($\hat{h}_{os}$) in a first direction and selecting the length associated to the most favourable decision value, and
a second adaptive channel estimator arranged to determine the second end point ($\hat{m}_L$) by determining a decision value for each of a number of possible lengths of the channel estimate ($\hat{h}_{os}$) in a second direction and selecting the length associated to the most favourable decision value.

9. The receiver according to claim 8, wherein the first adaptive channel estimator relates the possible lengths to a starting value ($N_{start}$) associated to an expected timing of the channel estimate ($\hat{h}_{os}$).

10. The receiver according to claim 9, wherein the second adaptive channel estimator relates the possible lengths to the first end point ($\hat{m}_R$).

11. The receiver according to claim 9, wherein the receiver comprises a timing misalignment determination unit for determining a timing misalignment between a determined timing of the channel estimate ($\hat{h}_{os}$) and the expected timing of the channel estimate ($\hat{h}_{os}$) defined by the starting value ($N_{start}$).

12. The receiver according to claim 11, wherein the timing misalignment determination unit determines the timing misalignment based on an expected relation between the starting sample value ($N_{start}$) and the first and/or the second end point.

13. The receiver according to claim 1, wherein the receiver is arranged to work in accordance with release 8 of the UMTS standard.

14. The receiver of claim 1, wherein the receiver is part of a base station.

15. The receiver of claim 14, wherein the base station comprises a transmitting unit operatively connected to the timing misalignment unit for transmitting information related to the misalignment to the associated user (u).

16. The receiver of claim 15, wherein the base station is part of a radio network.

17. The receiver of claim 1, wherein the receiver is part of a terminal.

18. A method for determining a channel estimate ($\hat{h}$) for a radio channel, said method comprising:
receiving a number of time domain signals ($y_n$) forming a plurality of symbols, each symbol having a cyclic prefix,
processing the received signals ($y_n$) so as to remove the prefix and form a vector ($R_u$) of received samples in the frequency domain for said user (u);
determining said channel estimate ($\hat{h}$) in the time domain for a user (u) based on known pilots in the received signals, wherein determining the channel estimate ($\hat{h}$) for a user (u) involves using a DFT matrix (V) with a fundamental period related to the number ($N_c$) of sub-carriers associated to said user (u);
determining a conjugate transpose $V^*_{N_c \cdot k}$ of the DFT matrix (V) having a fundamental period of $N_c \cdot k$,
determining a conjugate transpose $D^*_u$ of a pilot matrix $D_u$ comprising pilot symbols in the frequency domain corresponding to said user (u), and
estimating the channel estimate as $\hat{h} = V^*_{N_c \cdot k} D^*_u R_u$.

19. The method according to claim 18, wherein a sub-set of rows in the channel estimate $\hat{h} = V^*_{N_c \cdot k} D^*_u R_u$ matrix is selected so as to form a channel tap reduced channel estimate ($\hat{h}_{os\_red}$).

20. The method according to claim 19, wherein the selection of a sub-set of rows comprises determining a first end point ($\hat{m}_R$) and a second end point ($\hat{m}_L$) for the channel estimate $\hat{h}_{os}$ and to select the sub-set of rows so that the channel tap reduced channel estimate $\hat{h}_{os\_red}$ only comprises rows between the first and second end points.

21. The method according to claim 20, wherein the determination of the first end point ($\hat{m}_R$) comprises determining a decision value for each of a number of possible lengths of the channel estimate $\hat{h}_{os}$ in a first direction starting from a starting sample value ($N_{start}$) and selecting that length which is associated to the most favourable decision value, and the determination of the second end point ($\hat{m}_L$) comprises determining a decision value for each of a number of possible lengths of the channel estimate $\hat{h}_{os}$ in a second direction opposite to said first direction and selecting that length which is associated to the most favourable decision value,

22. The method according to claim 20, wherein a timing misalignment between an expected timing of the channel tap reduced channel estimate and the determined channel tap reduced channel estimate ($\hat{h}_{os\_red}$) is determined.

23. The method according to claim 22, wherein information relating to the timing misalignment is transmitted to the user (u).

\* \* \* \* \*

UNITED STATES PATENT AND TRADEMARK OFFICE
CERTIFICATE OF CORRECTION

| | |
|---|---|
| PATENT NO. | : 8,594,582 B2 |
| APPLICATION NO. | : 12/599426 |
| DATED | : November 26, 2013 |
| INVENTOR(S) | : Sahlin |

It is certified that error appears in the above-identified patent and that said Letters Patent is hereby corrected as shown below:

The title page showing the illustrative figure should be deleted to be replaced with the attached title page.

On the Title Page, Item (54) and in the Specification, Column 1, Line 2, in Title, delete "AN METHOD" and insert -- A METHOD --, therefor.

On the Title Page, Item (57), under "ABSTRACT", in Column 2, Line 9, delete "estimate ($h_{os}$) estimate ($h_{os}$)" and insert -- estimate ($h_{os}$) --, therefor.

In the Drawings:

The drawing sheet, consisting of Fig. 10, should be deleted to be replaced with the drawing sheet, consisting of Fig. 10, as shown on the attached pages.

In the Specification:

In Column 1, Line 66, delete "precalculated" and insert -- pre-calculated --, therefor.

In Column 10, Line 14, delete "determinaant" and insert -- determinant --, therefor.

In Column 10, Line 15, delete "covairance" and insert -- covariance --, therefor.

In Column 12, Line 7, delete "k=0,K,$N_c$-1," and insert -- k=0, ... , $N_c$-1, --, therefor.

In Column 12, Line 8, delete "r=0,K, $N_r$-1." and insert -- r=0, ... , $N_r$-1. --, therefor.

Signed and Sealed this
Twenty-ninth Day of July, 2014

Michelle K. Lee
*Deputy Director of the United States Patent and Trademark Office*

CERTIFICATE OF CORRECTION (continued)
U.S. Pat. No. 8,594,582 B2

In the Claims:

In Column 13, Line 13, in Claim 1, delete "comprising" and insert -- comprising: --, therefor.

In Column 13, Line 31, in Claim 1, delete "OFT" and insert -- DFT --, therefor.

In Column 13, Line 37, in Claim 1, delete "user (u):" and insert -- user (u); --, therefor.

In Column 15, Line 17, in Claim 22, delete "($\hat{h}_{os\_red}$)is" and insert -- ($\hat{h}_{os\_red}$) is --, therefor.

(12) United States Patent
Sahlin

(10) Patent No.: US 8,594,582 B2
(45) Date of Patent: Nov. 26, 2013

(54) RECEIVER FOR A RADIO NETWORK AND AN METHOD FOR DETERMINING A CHANNEL ESTIMATE FOR A RADIO CHANNEL

(75) Inventor: Henrik Sahlin, Mölnlycke (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 800 days.

(21) Appl. No.: 12/599,426

(22) PCT Filed: May 9, 2007

(86) PCT No.: PCT/SE2007/050320
§ 371 (c)(1),
(2), (4) Date: Nov. 9, 2009

(87) PCT Pub. No.: WO2008/140368
PCT Pub. Date: Nov. 20, 2008

(65) Prior Publication Data
US 2010/0317305 A1 Dec. 16, 2010

(51) Int. Cl.
*H04B 17/00* (2006.01)

(52) U.S. Cl.
USPC .................... 455/67.11; 375/260

(58) Field of Classification Search
None
See application file for complete search history.

(56) References Cited

U.S. PATENT DOCUMENTS

| | | | |
|---|---|---|---|
| 2004/0146117 A1* | 7/2004 | Subramaniam et al. | 375/260 |
| 2004/0203442 A1* | 10/2004 | Krishnan et al. | 455/67.11 |
| 2007/0110201 A1* | 5/2007 | Mergen et al. | 375/350 |
| 2009/0268787 A1* | 10/2009 | Cairns et al. | 375/148 |

FOREIGN PATENT DOCUMENTS

| | | |
|---|---|---|
| JP | 2007-096468 A | 4/2007 |
| WO | WO2006/096784 | 9/2006 |

* cited by examiner

*Primary Examiner* — Zhiyu Lu

(57) ABSTRACT

The present invention relates to a receiver for a radio network. The receiver comprises a receiving unit and a channel estimation unit (18). The receiving unit is arranged to receive a number of time domain signals forming a plurality of symbols, each symbol having a cyclic prefix. The channel estimation unit is (18) arranged to determine a channel estimate ($h_{o,x}$) in the time domain for a user (u) based on known pilots in the signals received by the receiving unit, and to determine the channel estimate ($h_{o,s}$) estimate ($h_{o,s}$) for a user (u) using a DFT matrix (V) with a fundamental period related to a number ($N_c$) of sub-carriers associated to said user (u), wherein the channel estimate ($h_{o,x}$) has a length of L taps, L being less that the number ($N_c$) of sub-carriers associated to said user. The present invention also relates to a method for determining a channel estimate ($h_{o,x}$) for a radio channel.

23 Claims, 5 Drawing Sheets